United States Patent
Fujita et al.

(10) Patent No.: US 7,735,724 B2
(45) Date of Patent: Jun. 15, 2010

(54) INFORMATION PROCESSING DEVICE, INFORMATION PROVIDING DEVICE, INFORMATION PROCESSING METHOD AND INFORMATION PROVIDING METHOD

(75) Inventors: Norihiko Fujita, Tokyo (JP); Motoaki Ogata, Tokyo (JP)

(73) Assignee: Sony Corporation, Tokyo (JP)

( * ) Notice: Subject to any disclaimer, the term of this patent is extended or adjusted under 35 U.S.C. 154(b) by 864 days.

(21) Appl. No.: 10/582,202

(22) PCT Filed: Dec. 10, 2004

(86) PCT No.: PCT/JP2004/018497
§ 371 (c)(1),
(2), (4) Date: Jun. 9, 2006

(87) PCT Pub. No.: WO2005/057449
PCT Pub. Date: Jun. 23, 2005

(65) Prior Publication Data
US 2007/0080209 A1    Apr. 12, 2007

(30) Foreign Application Priority Data
Dec. 12, 2003   (JP) .............................. 2003-414833

(51) Int. Cl.
*G06K 5/00* (2006.01)
(52) U.S. Cl. ........................ 235/380; 235/492; 705/14; 705/39
(58) Field of Classification Search ................ 235/380, 235/492, 493; 713/172; 705/14, 39
See application file for complete search history.

(56) References Cited

U.S. PATENT DOCUMENTS

| 6,032,857 A | * | 3/2000 | Kitagawa et al. | ............ 235/379 |
| 6,039,250 A | * | 3/2000 | Ito et al. | ...................... 235/380 |
| 6,594,640 B1 | | 7/2003 | Postrel | |

(Continued)

FOREIGN PATENT DOCUMENTS

EP        0949595       10/1999

(Continued)

OTHER PUBLICATIONS

Jean S et al:, Using Some Database Principles to Improve Cooperation in Multi-Application Smart Cards, Computer Science Society, 2001_Proceedings. XXI International L Conference of the Chilean Punta Arenas, Chile Nov. 7-9, 2001, Los Alamitos, CA, USA, IEEE Comput. Soc, US, Nov. 7, 2001, pp. 154-160.

*Primary Examiner*—Michael G Lee
*Assistant Examiner*—Kristy A Haupt
(74) *Attorney, Agent, or Firm*—K&L Gates LLP

(57) ABSTRACT

A function for processing electronic money is installed in a mobile phone 7 provided with a contactless IC chip. At this time, an electronic money member number is written to the contactless IC chip.

The user accesses a point site on a point server 10 through a user terminal, and logs in thereto. The user enters the electronic money member number in the point site. The point server 10 transmits a combination of the electronic money member number and the user's point member number to an electronic money server 2. The electronic money server 2 receives the electronic money member number and the point member number from the point server 10, and memorizes them after establishing a linkage therebetween.

6 Claims, 12 Drawing Sheets

U.S. PATENT DOCUMENTS

| | | |
|---|---|---|
| 7,360,091 B2 * | 4/2008 | Aikawa et al. ............. 713/172 |
| 2001/0014869 A1 | 8/2001 | Yoshizawa |
| 2002/0026444 A1 | 2/2002 | Takahashi |
| 2002/0052838 A1 | 5/2002 | Yamada |
| 2002/0142751 A1 | 10/2002 | Abe |
| 2003/0018577 A1 * | 1/2003 | Fukushima et al. ........... 705/39 |
| 2003/0033203 A1 * | 2/2003 | Inoue et al. .................. 705/14 |
| 2003/0163376 A1 * | 8/2003 | Inoue et al. .................. 705/14 |
| 2004/0049421 A1 * | 3/2004 | Hagiwara .................... 705/14 |

FOREIGN PATENT DOCUMENTS

| | | |
|---|---|---|
| JP | 2001-291039 | 10/2001 |
| JP | 2001 325507 | 11/2001 |
| JP | 2002-325173 | 11/2002 |
| JP | 2003-141428 | 5/2003 |

* cited by examiner

ELECTRONIC MONEY MEMBER NUMBER (MOBILE) − POINT MEMBER NUMBER = ELECTRONIC MONEY MEMBER NUMBER (CARD)

INFORMATION PROCESSING DEVICE, INFORMATION PROVIDING DEVICE, INFORMATION PROCESSING METHOD AND INFORMATION PROVIDING METHOD

CROSS-REFERENCE TO RELATED APPLICATION

This application is a U.S. national stage application of International Application No. PCT/JP2004/018497, filed Dec. 10, 2004, claiming a priority date of Dec. 12, 2003, and published in a non-English language.

BACKGROUND OF THE INVENTION

1. Field of the Invention

The present invention relates to information processing devices, information providing devices, information processing methods and information providing methods, which, for example, redeem points issued as a bonus by business entities for electronic money.

2. Description of the Related Art

Recent years have seen active distribution of electronic money through IC cards. Specifically, a currency value called VALUE is memorized in an IC card, and the VALUE is increased/decreased to transfer the currency value.

The IC card is provided with an IC chip having incorporated therein a program for carrying out an electronic money function, a memory function for memorizing VALUE and an arithmetic function, and by inputting an addition command, a subtraction command or the like through an electronic money terminal or the like, it is possible to add or subtract VALUE equivalent to a certain amount of money in the IC card.

Accordingly, for example, by receiving cash from the user and adding VALUE equivalent to the amount of cash to the IC card, it is possible to accumulate the VALUE into the IC card, so that when the user makes a purchase, VALUE equivalent to the amount of payment is subtracted from the IC card, thereby making a payment.

By introducing such a prepaid electronic money system, it is possible to use VALUE as a substitute for currency.

There are contact- and contactless-type IC cards, and the contactless-type is widely used.

The contactless-type IC card includes an antenna connected to a contactless IC chip, and through this antenna, the IC card is able to carry out short-distance wireless communication with an electronic money terminal. Also, the power for driving the IC card is wirelessly transmitted from the electronic money terminal.

Recently, attempts have been made to embed mobile phones with a contactless IC chip for the contactless-type IC card in order to confer the function of the contactless-type IC card to the cell phones.

By embedding the mobile phones with the contactless IC chip, it is possible to manage VALUE by the cell phones.

As a result, by placing a mobile phone close to the electronic money terminal so as to allow the contactless IC chip to communicate with the electronic money terminal, it is possible to add and subtract VALUE.

Further, in the case where the cell phone has the function of connecting with the Internet, it is possible to connect the cell phone to the Internet, and add/subtract VALUE to/from the contactless IC chip by way of the Internet.

Such electronic money payment systems using a cell phone include the following.

Patent Document 1: Japanese Laid-Open Patent Publication No. 2002-352173

On the other hand, business entities running a certain business generally carry out issuing points to customers as part of their customer services.

For example, mass retailers of electronic appliances issue points based on the customers' purchase price, and the customers can make a payment to the mass retailers with accumulated points.

A point card having a point member number memorized thereon is issued to users, and point addition and subtraction are carried out on the server using the point member number.

By providing such a point service to the customers, it is possible for the customers to obtain products inexpensively, whereas the business entities can keep the customers.

Further, recently, it has become common to use IC cards each having embedded therein the function of processing electronic money and the function of a point card (for memorizing a point member number, which is read by terminals at stores).

An electronic money business entity and a business entity which issues points (hereinafter, the point business entity) cooperate with each other, such that accumulated points are redeemed for VALUE, or points are issued based on the amount of used VALUE.

In this case, an electronic money member number and a point member number are previously embedded in the IC card during the production of the IC card, in order to link (associate) the electronic money number with the point member number and enable interchanging of VALUE and points based on the association between the electronic money member number and the point member number.

SUMMARY OF THE INVENTION

The contactless IC chip provided in the mobile phone has stored therein a program realizing a basic function at the time when the user purchases the mobile phone, but does not have implemented therein an application program for realizing the electronic money function, for example.

Therefore, after the purchase of the mobile phone, the user downloads an issuance program for realizing an electronic money function (a program for incorporating the function of processing electronic money into the contactless IC chip of the cell phone) into the cell phone via the Internet, for example, and installs it.

It is also conceivable that before the mobile phone is distributed to the user, a business entity such as a mobile phone distributor performs the installation.

As such, in the case of providing the mobile phone with the contactless IC chip, the issuance program is installed later, and therefore there is a problem as to how to link a point member number for a point card owned by the user with an electronic money member number.

Thus, an object of the present invention is to efficiently associate an electronic money member number (electronic money function ID information) set for the electronic money function or the like installed in the contactless IC chip of the cell phone with a point member number (point ID information) for a point service.

An information processing device according to the present invention is an information processing device for use in an information processing system having a function of communicating with a point managing device for managing accumulation and use of a point usable as an exchange value exchangeable with a predetermined product for each point ID information set for a user, which is an object to which the point is given, and a mobile terminal memorizing electronic money, which is electronic information representing an amount of currency value and transferring the currency value by increasing/decreasing the amount, having an electronic money processing function for executing a predetermined command to add/subtract the memorized amount of electronic money and being identifiable with electronic money function ID information set in association with the electronic money processing function (i.e., having a function for communicating with the point managing device and the mobile terminal), the information processing system having memorized therein an association between the point ID information and the electronic money function ID information and performing redeeming of a point managed with the memorized point ID information and electronic money memorized in a mobile terminal identified by electronic money function ID information, the information processing device including program transmitting means for transmitting a predetermined program for forming the electronic money processing function to the mobile terminal before forming the electronic money processing function, electronic money function ID information retrieving means for retrieving electronic money function ID information set in association with the electronic money processing function formed by executing the transmitted predetermined program in the mobile terminal, point ID information retrieving means for retrieving point ID information set for a user of the mobile terminal, associating means for associating the retrieved electronic money function ID information with the retrieved point ID information, point information receiving means for receiving the number of points and the point ID information from the point managing device, command generating means for generating a command to redeem the received number of points for electronic money at a predetermined redeeming rate and add the electronic money obtained by redeeming, and command transmitting means for transmitting the generated command to a mobile terminal identified with the electronic money function ID information associated with the received point ID information by the associating means.

Also, in the information processing device of the present invention, the associating means may be capable of associating a single piece of point ID information with a plurality of pieces of electronic money function ID information, and a mobile terminal to which electronic money obtained by redeeming a point managed with the single piece of point ID information is added may be selectable from mobile terminals identified with the plurality of pieces of electronic money function ID information associated with the single piece of point ID information.

Also, the information processing device of the present invention may include point issuing means for issuing a point in response to a use of electronic money, and the point managing device may manage, with the single piece of point ID information, points issued by using electronic money with the mobile terminals identified with the plurality of pieces of electronic money function ID information and may provide the points issued by the point issuing means by using electronic money with the mobile terminals identified with the plurality of pieces of electronic money function ID information to the point managing device together with point ID information associated with the electronic money function ID information for the mobile terminals.

Also, the information processing device of the present invention may be an information providing device for providing point ID information and electronic money function ID information, point ID information retrieving means for retrieving point ID information, reading program transmitting means for transmitting, to a mobile terminal having an electronic money processing function, a reading program for reading electronic money function ID information set in association with the electronic money processing function and transmitting the electronic money function ID information to a predetermined recipient, and electronic money function ID information receiving means for receiving electronic money function ID information transmitted by the mobile terminal by executing the transmitted reading program at the mobile terminal, the retrieved point ID information is provided to the point ID information retrieving means of the information processing device, and the received electronic money function ID information is provided to the electronic money function ID information retrieving means of the information processing device.

An information processing method according to the present invention is an information processing method, which is a process carried out by a computer for use in an information processing system having a function of communicating with a point managing device for managing accumulation and use of a point usable as an exchange value exchangeable with a predetermined product for each point ID information set for a user, which is an object to which the point is given, and a mobile terminal memorizing electronic money, which is electronic information representing an amount of currency value and transferring the currency value by increasing/decreasing the amount, having an electronic money processing function for executing a predetermined command to add/subtract the memorized amount of electronic money and being identifiable with electronic money function ID information set in association with the electronic money processing function, the information processing system having memorized therein an association between the point ID information and the electronic money function ID information and performing redeeming of a point managed with the memorized point ID information and electronic money memorized in a mobile terminal identified by electronic money function ID information, the computer includes program transmitting means, electronic money function ID information retrieving means, point ID information retrieving means, associating means, point information receiving means, command generating means and command transmitting means, and the method includes a program transmitting step by the program transmitting means for transmitting a predetermined program for forming the electronic money processing function to the mobile terminal before forming the electronic money processing function, an electronic money function ID information retrieving step by the electronic money function ID information retrieving means for retrieving electronic money function ID information set in association with the electronic money processing function formed by executing the transmitted predetermined program in the mobile terminal, a point ID information retrieving step by the point ID information retrieving means for retrieving point ID information set for a user of the mobile terminal, an associating step by the associating means for associating the retrieved electronic money function ID information with the retrieved point ID information, a point information receiving step by the point information receiving means for receiving the number of points and the point ID information from the point managing device, a command generating step by the command generating means for generating a command to redeem the received number of points for electronic money at a predetermined redeeming rate and add the electronic money obtained by redeeming, and a command transmitting step by the command transmitting means for transmitting the generated command to a mobile terminal identified with the electronic money function ID information associated with the received point ID information by the associating means.

Also, the information providing method of the present invention is an information providing method, which is a process carried out by an information providing device composed of a computer for providing point ID information and electronic money function ID information to the information processing device, the computer includes point ID information retrieving means, reading program transmitting means, electronic money function ID information receiving means and providing means, and the method includes a point ID information retrieving step by the point ID information retrieving means for retrieving point ID information, a reading program transmitting step by the reading program transmitting means for transmitting, to a mobile terminal having an electronic money processing function, a reading program for reading electronic money function ID information set in association with the electronic money processing function and transmitting the electronic money function ID information to a predetermined recipient, an electronic money function ID information receiving step by the electronic money function ID information receiving means for receiving electronic money function ID information transmitted by the mobile terminal by executing the transmitted reading program at the mobile terminal, and a providing step by the providing means for providing the retrieved point ID information to the point ID information retrieving means of the information processing device and providing the received electronic money function ID information to the electronic money function ID information retrieving means of the information processing device.

The present invention makes it possible to efficiently associate the electronic money function ID information with the point ID information.

DESCRIPTION OF THE PREFERRED EMBODIMENTS

Summary of Embodiment

A user, after having purchased a cell phone provided with a contactless IC chip, connects the cell phone to the Internet to download an issuance program.

Then, the issuance program is executed on the cell phone to install the function of processing electronic money into the contactless IC chip. At this time, an electronic money member number is written to the contactless IC chip, and also on an electronic money server for managing log data concerning addition/subtraction of VALUE, the electronic money member number is added as an object that is to be managed with the log data.

Next, the user accesses through a user terminal a point site set up over the Internet by a point business entity using a point server, and logs in thereto.

The user is already a point member, and therefore when the user enters authentication information such as a user ID and a password in the point site, the point server can identify the user's point member number.

The electronic money member number set in the contactless IC chip of the cell phone can be presented on the display of the cell phone, and the user refers to it to enter the electronic money member number in the point site.

As such, the point server obtains the electronic money member number from the user, and transmits a combination of the electronic money member number and the user's point member number to the electronic money server.

The electronic money server receives the electronic money member number and the point member number from the point server, and memorizes them after establishing a linkage therebetween.

In a manner as described above, by linking the electronic money member number with the point member number, it is possible to provide the user with services relating VALUE with points, e.g., redeeming points accumulated by the user for VALUE or issuing points based on VALUE used by the user.

Details of Embodiment

Figure 1:
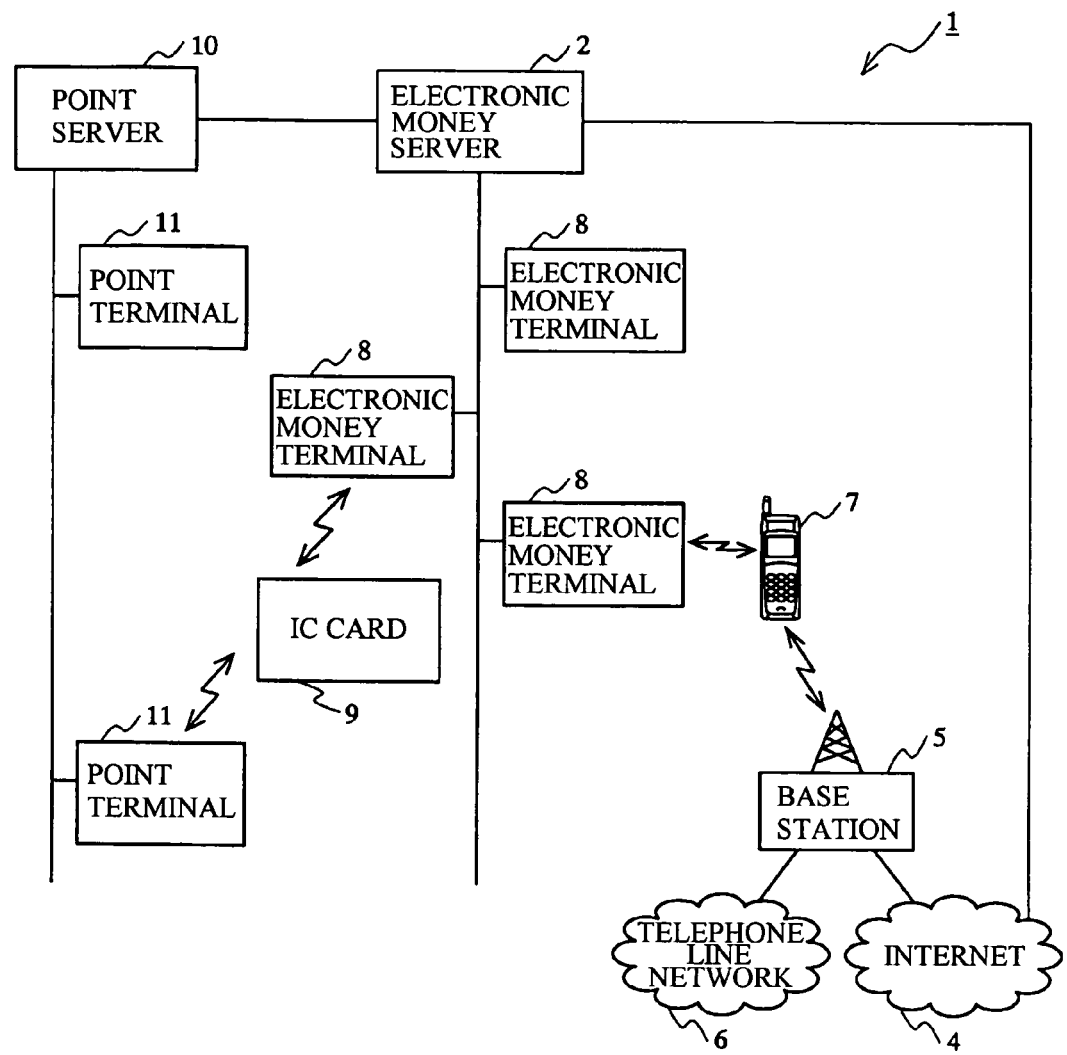
FIG. 1 is a block diagram schematically illustrating the configuration of an information processing system according to the present embodiment.

FIG. 1 is a block diagram schematically illustrating the configuration of an information processing system 1 according to the present embodiment.

The information processing system 1 is so configured that an electronic money server 2, an electronic money terminal 8, a mobile phone 7, a base station 5, the Internet 4, and so on, which are used for performing electronic money-related information processing, are connected to a point server 10, a point terminal 11, and so on, which perform point-related information processing.

An IC card 9 has both the function of a point card and the function of processing VALUE with electronic money. The IC card 9 and the mobile phone 7 are owned by the same user.

Note that the contactless IC chip included in the mobile phone 7 and the IC card 9 is a kind of computer provided with an arithmetic device, such as a CPU (Central Processing Unit), and a memory device, and the contactless IC chip also has the communication function, therefore the mobile phone 7 and the IC card 9 constitute a mobile terminal.

The mobile phone 7, in addition to having the function of connecting with the Internet, includes a contactless IC chip applicable to an application of the electronic money card, and is able to communicate with the electronic money terminal 8 to perform addition (referred to as "charge") and subtraction (called "payment") of VALUE.

Note that the VALUE is a notion corresponding to currency in use of electronic money, and it is currency information representing the amount in currency value as electronic information.

When issuing VALUE, currency equivalent thereto is collected from the user, and dispensed to stores having received a payment in VALUE (hereinafter, "affiliated stores") based on the amount of payment, thereby achieving the counterbalance between VALUE and real currency.

While the present embodiment is described with respect to the mobile phone 7, any other mobile terminal device, e.g., a PDA (Personal Digital Assistant), may be used instead of using the mobile phone 7.

Note that in the present embodiment, it is assumed that the contactless IC chip is included in the mobile phone 7, but in addition to this, it is also possible to employ a SIM card scheme or the like to configure the contactless IC chip to be removable from the mobile phone 7.

In such a case also, it is possible for the electronic money server 2 to transmit the below-described issuance program to the mobile phone 7 and incorporate an electronic money function part into a contactless IC chip attached to the mobile phone 7.

By such incorporation, the below-described electronic money member number is memorized in the removable contactless IC chip. Accordingly, when the contactless IC chip having the electronic money function part incorporated therein is detached from the mobile phone 7 and inserted into another mobile phone, the cell phone having it inserted therein functions anew as a mobile phone 7.

The IC card 9 includes a contactless-type IC chip and an antenna for communicating with the electronic money terminal 8 and the point terminal 11, and is able to carry out short-range wireless communication with the point terminal 11 and the electronic money terminal 8.

The IC card 9 provides a point member number to the point terminal 11, and the point server 10 adds/subtracts points with respect to the point member number.

Also, the IC card 9 receives an addition command and a subtraction command from the electronic money terminal 8, and therefore can carry out addition and subtraction of VALUE as in the mobile phone 7.

The power for driving the contactless-type IC chip in the IC card 9 is wirelessly supplied from the electronic money terminal 8 and the point terminal 11.

Note that the IC card 9 may include only the point function, but in the present embodiment, in order to increase the user's convenience, both the point function and the electronic money function are conferred to a single card.

Therefore, in the IC card 9, both the point member number and the electronic money member number are memorized in the same contactless IC chip. In addition, the point function and the electronic money can be implemented by separate contactless IC chips.

Further, in the present embodiment, it is assumed that the point member number is memorized in the contactless IC chip, but in addition to this, the point member number can be memorized in a magnetic stripe formed on the IC card 9, and can be read by the point terminal 11 provided with a magnetic head or can be indicated on the IC card 9 by embossing (intaglio and relief printing), for example. In these cases, it is not necessary to confer the point function to the contactless IC chip.

The base station 5 is able to wirelessly communicate with the mobile phone 7, thereby connecting the mobile phone 7 to the telephone network 6 or the Internet 4.

The telephone network 6 is a so-called public line network, which allows terminal devices such as telephones and fax machines to connect together. By connecting the mobile phone 7 to the telephone network 6, the base station 5 can provide the user with a call service.

The Internet 4 is a network for connecting server devices, terminal devices and so on. The Internet 4 uses protocols, e.g., TCP/IP (Transmission Control Protocol/Internet Protocol).

The Internet 4 is connected to server devices for providing various services, and by connecting the mobile phone 7 to the Internet 4, the base station 5 allows the user to take advantage of services provided over the Internet 4.

The electronic money server 2 is a server device set up by an electronic money business entity, which collects information concerning issuance and use statuses of VALUE, and based on this, carries out a variety of types of information processing for operating an electronic money business.

Also, the electronic money server 2 is connected to the Internet 4, and provides various electronic money-related services over the Internet 4.

In the present embodiment, the electronic money server 2, in addition to providing an issuance program (a program for incorporating the electronic money function into the contactless IC chip included in the IC card 9) to the mobile phone 7 by way of the Internet 4, provides various services in an electronic money site set up on the electronic money server 2.

In addition, the electronic money site can be accessed through a user terminal composed of, for example, a personal computer.

Further, as will be described in detail later, the electronic money server 2, in addition to having memorized the electronic money member number in association with the point member number in the IC card 9, has memorized therein an electronic money member number set for the mobile phone 7, which is linked with the point member number.

The electronic money member number is ID information set for electronic money function parts of the mobile phone 7 and the IC card 9, in order to identify mobile terminals provided with the electronic money function part, and constitutes electronic money function ID information.

The electronic money server 2 is able to communicate with the point server 10, and use these correspondences by linkage to redeem (convert) the user's points managed on the point server 10 for VALUE, or allow the point server 10 to issue points based on VALUE used by the user.

Also, when the user uses VALUE in the IC card 9 for payment, the electronic money member number of the IC card 9 becomes an object for which points are issued, and when VALUE in the mobile phone 7 is used for payment, the electronic money member number of the mobile phone 7 becomes an object for which points are issued, but the electronic money server 2 can use the linkage of the electronic money member numbers to separately or collectively process these points.

The electronic money terminal 8 is a terminal device for accessing a contactless IC card, which is a specialized device configured for a point business and set up at a store or the like of the point business entity.

The electronic money terminal 8 includes a reader/writer including an antenna, and is able to transmit/receive radio waves with this antenna, thereby carrying out short-distance wireless communication with an electronic money function part 16 of the mobile phone 7 and an electronic money function part 19 of the IC card 9.

The electronic money terminal 8 wirelessly communicates with the mobile phone 7 and the IC card 9 to write VALUE therein or subtract VALUE for payment.

The electronic money terminal 8 is connected to the electronic money server 2 through a communication line, and transmits to the electronic money server 2 information concerning processing of VALUE performed on the mobile phone 7 and the IC card 9 by the electronic money terminal 8. This transmission process can be performed in real time, but in the present embodiment, it is so configured that information is accumulated to some extent and collectively transmitted to the electronic money server 2 by batch processing.

Therefore, the electronic money terminal 8, when communicating with the mobile phone 7 or the IC card 9 to process VALUE, is not required to access the electronic money server 2, and therefore can carry out processing of VALUE at high speed.

The point server 10 is a server device set up by the point business entity, and performs a variety of types of information processing for operating a point business, e.g., issuing and accumulated points for each point member or, if any point has been used by the user, subtracting it from points accumulated by the user.

The point member number issued for each point member is ID information for identifying the user to which a point is to be given, and constitutes point ID information.

Although not shown in the diagram, the point server 10 is connected to the Internet 4, and provides various point-related services at a point site over the Internet 4.

The user is able to access the point site through the user terminal device, and enter a user ID and a password which are set for him/herself to log in to the site.

In addition, at the point site, it is possible to refer to the current balance of points or make a redeeming application for redeeming points being currently accumulated for VALUE.

Also, the point server 10 and the electronic money server 2 are provided so as to be connectable to each other via a communication line.

The point terminal 11 is a terminal device for accessing a contactless IC card, which is a specialized device configured for point business and set up at a store or the like of the point business entity.

The configuration of the point terminal 11 is similar to that of the electronic money terminal 8, and transmits/receives radio waves with a reader/writer having an antenna provided therein, thereby performing short-distance wireless communication with the IC card 9 to read the point member number and other information.

The point terminal 11 is connected to the point server 10 through a communication line, and the point terminal 11 is able to transmit to the point server 10 the read information and information concerning the number of added points or the number of subtracted points.

This allows the point server 10 to carry out a variety of types of point business-related information processing.

As such, regarding the points, the communication with the point server 10 is carried out in real time to manage the points on the point server 10.

Figure 2:
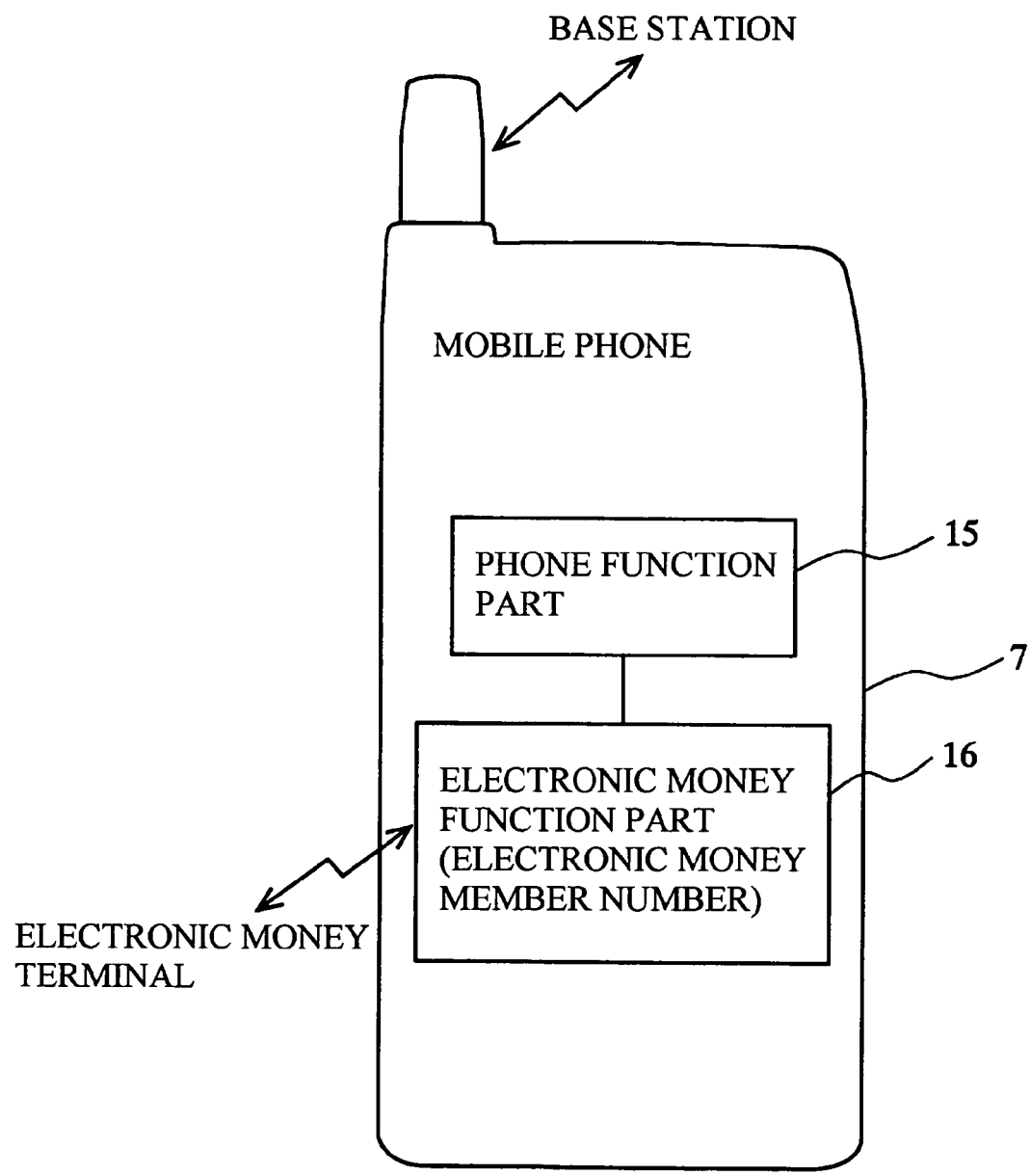
FIG. 2 is a block diagram schematically illustrating the functional configuration of a cell phone.

FIG. 2 is a block diagram schematically illustrating the functional configuration of the mobile phone 7.

The mobile phone 7 is so configured that a telephone function part 15 and the electronic money function part 16 are connected by an interface.

The telephone function part 15 is a function part originally provided in the mobile phone 7, which wirelessly communicates with the base station 5 to perform the function of calling by phone and the function of connecting with the Internet.

The user is able to select a call mode and an Internet mode by, for example, operating operational buttons of the mobile phone 7.

In the case where the mobile phone 7 functions over the Internet, various sites set up over the Internet 4 can be accessed to utilize various services provided by the sites.

It is also possible to access, through the mobile phone 7, the electronic money site set up on the electronic money server 2 and the point site set up on the point server 10.

This makes it possible to, for example, access through the mobile phone 7 the electronic money site to download an issuance program and execute it to form the electronic money function part 16 in the contactless IC chip.

Also, the electronic money server 2 issues the electronic money member number for each terminal such as the IC card 9 and the mobile phone 7, and uses the electronic money member number to manage log data concerning VALUE for each terminal, but in the case where the electronic money function part 16 is incorporated in the mobile phone 7, the electronic money member number is previously included in the issuance program or the electronic money member number is obtained by accessing the electronic money site after the incorporation of the electronic money function part 16, to memorize a unique electronic money member number in the electronic money function part 16.

The electronic money function part 16 is a function part for performing an electronic money-related process, and composed of a contactless IC chip. Also, it is provided with an antenna for wirelessly communicating with the electronic money terminal 8.

The contactless IC chip is a computer including a nonvolatile readable/writable memory medium composed of a flash memory or an EEPROM (Electrically Erasable and Programmable ROM), a CPU (Central Processing Unit) and, in addition, a ROM (Read Only Memory) or a RAM (Random Access Memory).

By installing an application program in the contactless IC chip, it is possible to carry out various functions, and in the present embodiment, the issuance program is used to install the electronic money processing function.

This makes it possible to use the mobile phone 7 in a manner similar to the IC card 9 to add and subtract VALUE.

In more detailed description, it is possible to memorize in the memory device of the electronic money function part 16 log data for recording the balance of VALUE and addition and subtraction of VALUE.

In addition, it is possible to input an addition command or subtraction command to which amount information is attached as a parameter to the electronic money function part 16 and execute it with the CPU to add or subtract VALUE.

The addition command and the subtraction command may be inputted to the electronic money function part 16 directly from the electronic money terminal 8 by radio or may be inputted through the telephone function part 15 to the electronic money server 2 via the Internet 4.

Figure 3:
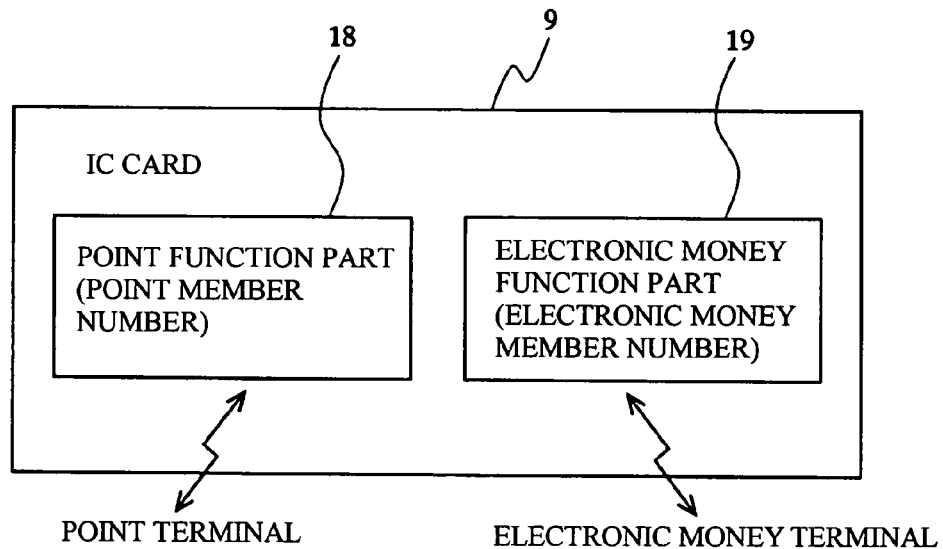
FIG. 3 is a block diagram schematically illustrating the functional configuration of an IC card.

FIG. 3 is a block diagram schematically illustrating the functional configuration of the IC card 9.

The IC card 9 is a card made of plastic including a contactless IC chip and an antenna similar to those of the mobile phone 7, and is allowed to carry out various functions by installing an application program therein.

In the present embodiment, the point function part 18 and the electronic money function part 19 are formed, and each of the function parts has stored therein a point member number, which is unique ID information used for a point business, and an electronic money member number, which is unique ID information used for an electronic money business.

In the case where the IC card 9 is used as a point card, the IC card 9 is held over the point terminal 11 to allow the point terminal 11 to read the point member number.

Note that when the IC card 9 is provided with a magnetic stripe and has the point member number memorized in the magnetic stripe, the point terminal 11 is provided with a magnetic head to read the point member number.

Further, a person in charge at a store inquires of the user whether to add points or whether to use points for payment, and the number of points that are to be added in the case of addition, or the number of points that are to be subtracted in the case of subtraction, is transmitted to the point server 10 together with the previously read point member number.

The point server 10 manages points of each user for each point member number, and settles points based on the information transmitted from the store.

In the case where the IC card 9 is used as an electronic money card, the IC card 9 is held over the electronic money terminal 8 to set the electronic money terminal 8 and the IC card 9 into such a state that they can communicate with each other.

Then, the person in charge at the store operates the electronic money terminal 8 to input to the IC card 9 an addition command or subtraction command to which amount information is attached as a parameter.

In the IC card 9, the CPU executes the addition command or subtraction command to add/subtract the amount specified by the amount information to/from the balance of VALUE memorized in the memory device included in the contactless IC chip.

At this time, the electronic money terminal 8 reads the electronic money member number from the IC card 9 to temporarily memorize it as log data together with the information concerning the processing performed by the IC card 9. The log data is transmitted later to the electronic money server 2 by batch processing.

Note that the point function part 18 and the electronic money function part 19 are previously incorporated into the IC card 9 in the course of manufacturing the IC card 9, and the manufacturer of the IC card 9 notifies to the electronic money business entity a combination of the point member number and the electronic money member number, which are incorporated in the IC card 9.

The electronic money business entity links together the point member number and the electronic money member number, which have been received from the manufacturer of the IC card 9, and memorize them in the electronic money server 2.

As such, in the present embodiment, points are accumulated and managed in the point server 10, VALUE is accumulated and managed in the IC card 9 and the mobile phone 7, and the electronic money server 2 manages the log data concerning the processing of VALUE.

Figure 4:
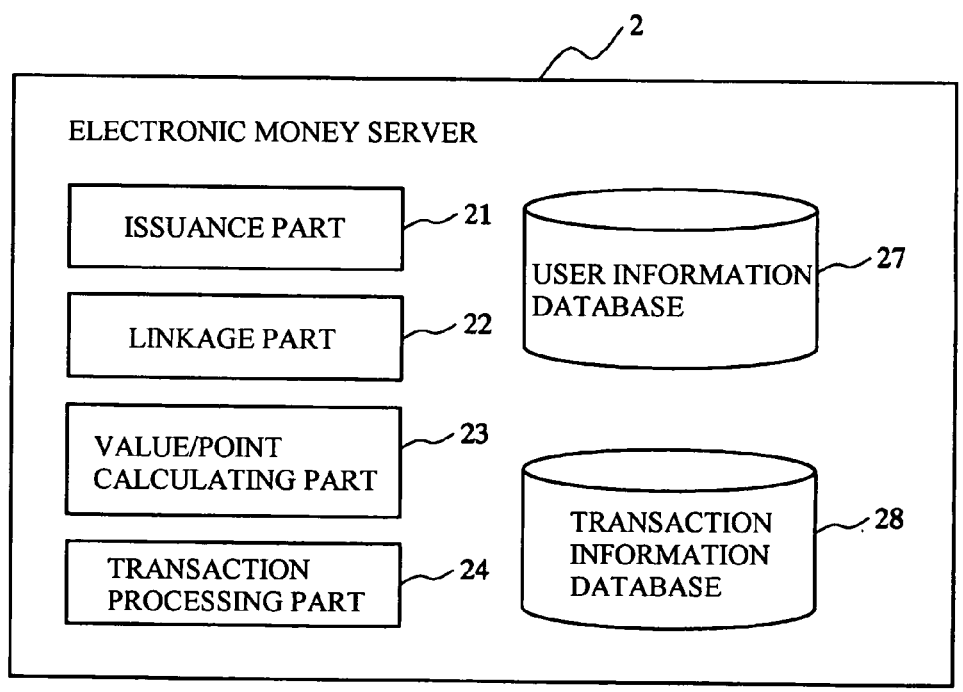
FIG. 4 is a block diagram schematically illustrating the functional configuration of an electronic money server.

FIG. 4 is a block diagram schematically illustrating the functional configuration of the electronic money server 2.

The electronic money server 2, in addition to including function parts such as an issuance part 21, a linkage part 22, a VALUE/point calculating part 23 and a transaction processing part 24, includes databases such as a user information database 27 and a transaction information database 28.

The issuance part 21 is a function part for transmitting an issuance program to the mobile phone 7 to allow the mobile phone 7 to have the electronic money function. Note that a process for incorporating the electronic money function into the contactless IC chip of the mobile phone 7 is referred to as "issuance".

The issuance part 21, at the time of issuance, updates the user information database 27, and registers, in the user information database 27, the electronic money member number set in the mobile phone 7 as a new object for log data processing.

The linkage part 22 is a function part for further linking the electronic money member number assigned to the mobile phone 7 with the point member number (paired with the electronic money member number), which has been previously notified from the manufacturer of the IC card 9 and memorized in the electronic money server 2 (user information database 27).

Hereinbelow, as the necessity arises, the electronic money member number memorized in the IC card 9 and the electronic money member number memorized in the mobile phone 7 are referred to as the electronic money member number (card) and the electronic money member number (mobile), respectively, to distinguish them from each other.

The VALUE/point calculating part 23 is a function part for, in cooperation with the point server 10, processing information related to VALUE and points, which redeems points accumulated in the point server 10 for VALUE or issues points based on VALUE used by the user.

The transaction processing part 24 is a function part for receiving log data from the electronic money terminal 8, updating the transaction information database 28, and managing the log data.

Also, in the case of performing addition or subtraction of VALUE at the electronic money function part 16 of the mobile phone 7 by way of the Internet 4, an addition command or subtraction command is generated and transmitted to the mobile phone 7, and the record thereof is memorized as log data in the transaction information database 28.

Also, the transaction processing part 24 is able to access through the user terminal composed of a personal computer the electronic money site on the electronic money server 2 via the Internet 4, and adds/subtracts VALUE to/from the IC card 9 or the mobile phone 7.

In such a case, the user terminal is connected to the reader/writer for reading from/writing to the contactless IC card, which is set with the IC card 9 or the mobile phone 7.

Then, the transaction processing part 24 transmits the addition command or subtraction command to the user terminal, and the user terminal inputs the command to the IC card 9 or the mobile phone 7 via the reader/writer.

The user information database 27 is a database having memorized therein information concerning IC cards 9, mobile phones 7, and, in addition, users using the information processing system 1.

The user information database 27 manages the users with the electronic money member number, and manages the users' personal information such as names, residences and e-mail addresses of the users.

In the case where a user uses an IC card 9, there is a point management number corresponding to the electronic money member number (card), and therefore, the user information database 27 manages them by linking them together.

Log data related to the use of the IC card 9 is managed with the electronic money member number (card).

In the case where a user uses a mobile phone 7, log data related to the use of the electronic money function part 16 of the mobile phone 7 is managed with the electronic money member number (mobile).

Note that in the present embodiment, when the user uses VALUE, points by a point business entity are issued in accordance with the usage thereof, but when the IC card 9 is used, points are issued for the electronic money member number (card), and when the mobile phone 7 is used, points are issued for the electronic money member number (mobile).

Also, in the case where a user owns both the IC card 9 and the mobile phone 7, the linkage part 22 links the point member number with the electronic money member number (mobile), and the linkage correspondence is memorized in the user information database 27.

Figures 5, 6:
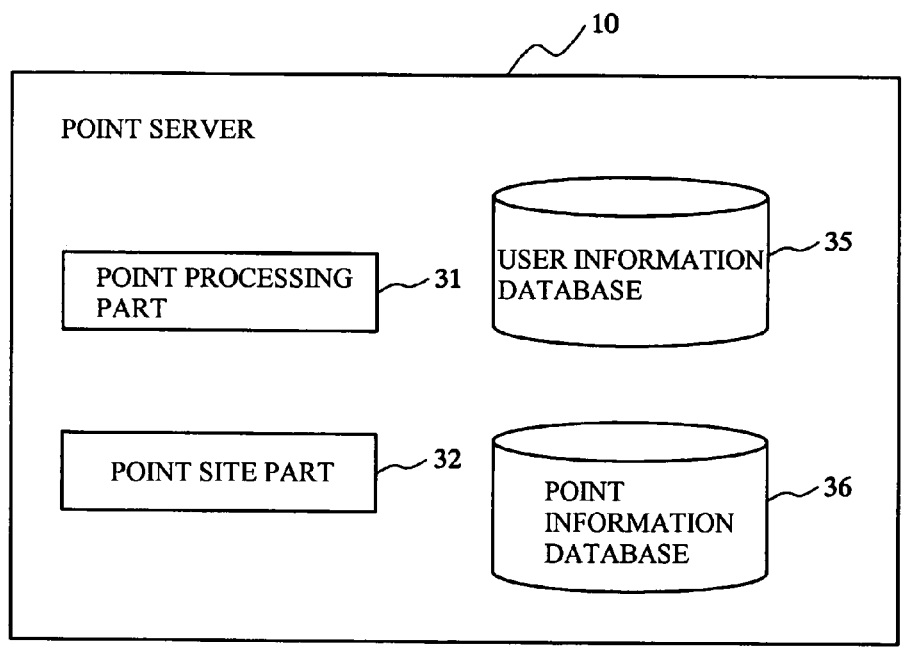
FIG. 5 is a representation showing the linkage correspondences among a point member number, an electronic money member number (mobile) and an electronic money member number (card)
FIG. 6 is a block diagram schematically illustrating the functional configuration of a point server.

This links the electronic money member number (mobile) and the electronic money member number (card) with respect to the point member number, as shown in FIG. 5.

The linkage correspondence makes it possible to combine points issued for the electronic money member number (mobile) with points issued for the electronic money member number (card).

Referring back to FIG. 4, the transaction information database 28 is a database having memorized therein log data representing the details of processing performed on each of the mobile phones 7 and the IC cards 9 by the transaction processing part 24.

With the user information database 27, it is possible to specify the details of information processing performed for each electronic money member number, e.g., changes in the balance of VALUE, the current balance, whether any point has been issued or not, transaction dates and ID information of accessed electronic money terminals 8 in the IC card 9 and the mobile phone 7, which are identified by each electronic money member number.

FIG. 6 is a block diagram schematically illustrating the functional configuration of the point server 10.

The point server 10 includes a point processing part 31, a point site part 32, a user information database 35, a point information database 36, and so on.

The point processing part 31 is a function part for managing the accumulation and use of points, such as addition and subtraction of points, on a user-by-user basis.

The point processing part 31 receives from the point terminal 11 a point member number and point addition/subtraction information designating whether to add or subtract points. The point addition/subtraction information is attached with the number of points, and the point processing part 31 adds/subtracts the number of points designated by the point addition/subtraction information to/from the number of points of the member identified by the point member number.

Also, in the case where the user has applied for redeeming of points for VALUE, points that are to be redeemed for VALUE are subtracted from the number of points of the user, and a request to generate VALUE equivalent to the subtracted number of points is transmitted to the electronic money server 2.

The VALUE generation request includes the point member number and the number of points that are to be redeemed for VALUE, and the electronic money server 2 issues VALUE equivalent to the amount of points for the point member number linked with the electronic money member number.

Also, in the case where the point member number is linked with the electronic money member number (card) and the electronic money member number (mobile), it is possible to designate which of the IC card 9 and the mobile phone 7 should receive VALUE.

Further, in the case where the user uses VALUE with the IC card 9 or the mobile phone 7 and therefore points are generated in the electronic money server 2, the point processing part 31 receives the number of points and the point member number from the electronic money server 2, and makes an addition to the user's points.

As will be described later, information concerning points of each user is accumulated in the point information database 36, and the point processing part 31 records thereto the point member number and a history of the number of points having been added/subtracted, thereby processing points for each user.

The point site part 32 is a function part for operating a point site over the Internet 4.

The point site, in addition to soliciting for joining the point service, authenticates users who are already point members with authentication information (user ID and password), and provides services specialized for the users.

The services for the point members include providing point-related information such as accepting an inquiry about the current point balance and an application for redeeming of points for VALUE, and in addition, information related to points and VALUE (e.g., the redeeming rate from point to VALUE).

In the present embodiment, it is assumed that the redeeming of points for VALUE is performed in units of 10,000 points, and 10,000 points are redeemed for 10,000 yen-worth of VALUE.

Note that the above is merely an example, and it may be so configured that the number of points that are to be redeemed for VALUE can be arbitrarily set by the user.

The user information database 35 is a database having memorized therein point member-related information for each user.

The information memorized in the user information database 35, in addition to including the authentication information, e.g., user IDs and passwords, includes personal information, such as names, residences and e-mail addresses of users, and point member numbers. Also, both the user IDs and the point member numbers are user-specific information uniquely set for a user, and therefore the point member numbers can be used as a user ID.

Also, the point server 10 is able to transmit a notice of service to e-mail addresses registered by the users.

The point information database 36 is a database for accumulating point-related data, and has memorized therein log data for point processing.

With user-specific information such as point member numbers, the point information database 36 is able to manage on a user-by-user basis point-related data such as the current point balance, number of points added in the past, dates of addition, subtracted points and dates of subtraction.

Figure 7:
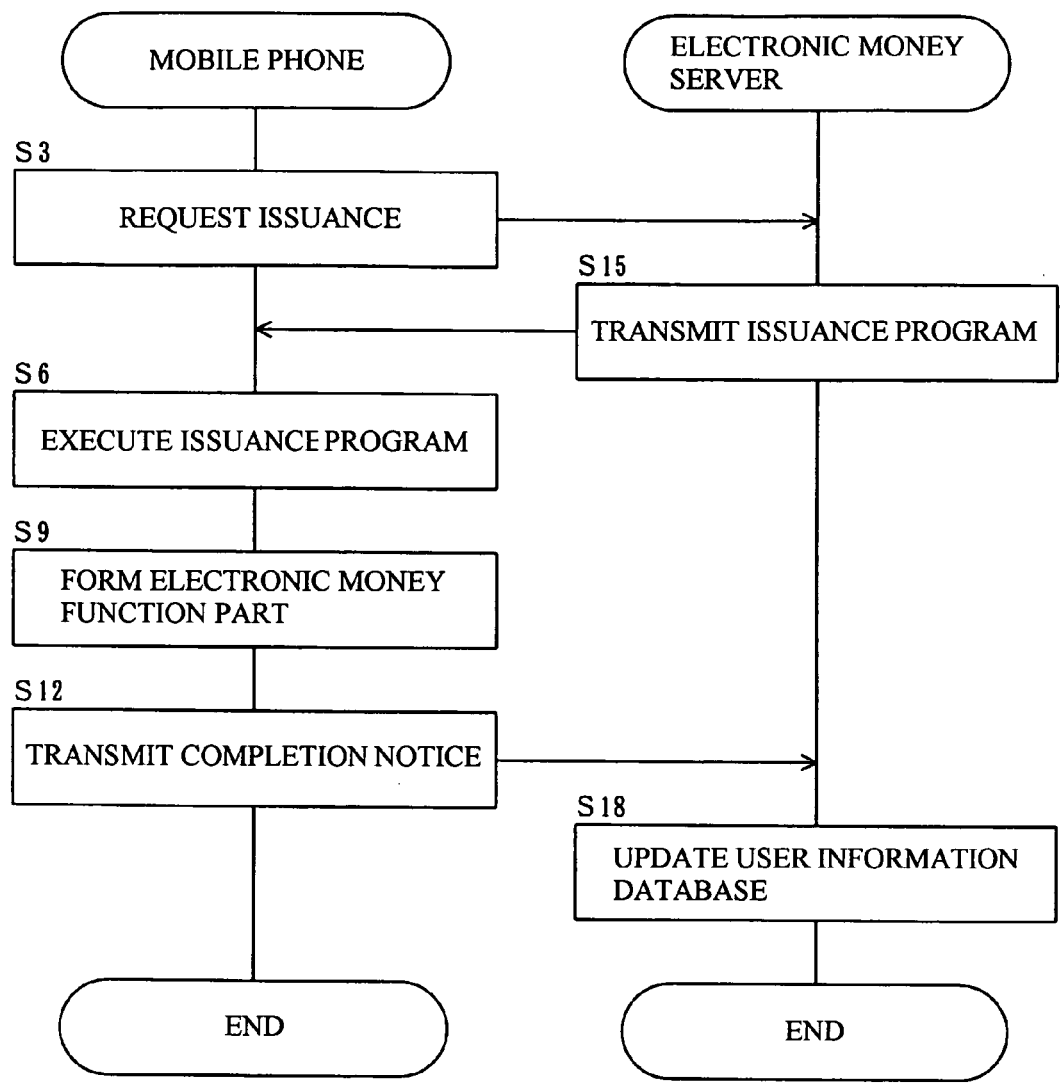
FIG. 7 is a flowchart for explaining the procedure of issuance to a cell phone.

FIG. 7 is a flowchart for explaining the procedure of issuance to a cell phone.

This procedure is applicable to, for example, the case of incorporating the electronic money function into a newly-purchased mobile phone 7 not having the electronic money function incorporated therein.

In the following process, it is assumed that the CPU provided in the telephone function part 15 of the mobile phone 7, the CPU provided in the electronic money function part 16 and the CPU provided in the electronic money server 2 each operate in accordance with a predetermined program.

Also, as can be seen from the following flowchart, the electronic money server 2 constitutes an information processing device for associating the point member number (point ID information) with the electronic money member number (electronic money function ID information).

First, the user accesses through the mobile phone 7 an electronic money site set up on the electronic money server 2 by way of the internet 4.

The electronic money site provides various services related to electronic money from which the user can select a desired service.

Here, an issuance service is selected, and the electronic money server 2 is demanded for issuance (step 3).

At this time, user information such as name, residence and e-mail address is also transmitted to the electronic money server 2.

Upon receipt of the issuance demand, the electronic money server 2 transmits an issuance program to the mobile phone 7 (step 15). As such, the electronic money server 2 includes a program transmitting means.

The issuance program is adapted to assign a predetermined electronic money member number (mobile) to the mobile phone 7.

The mobile phone 7 receives the issuance program. The issuance program is memorized in a RAM (Random Access Memory) or the like provided in the telephone function part 15.

Next, the user operates buttons in accordance with operational guidance presented on the display of the mobile phone 7 to execute the issuance program memorized in the RAM or the like (step 6).

As a result, the CPU of the mobile phone 7 communicates with the CPU of the contactless IC chip to form the electronic money function part 16 in the contactless IC chip (step 9). At this time, a predetermined electronic money member number (mobile) is set in the electronic money function part 16.

The CPU of the mobile phone 7 communicates with the contactless IC chip, and if it is confirmed that the electronic money function part 16 has been formed in the contactless IC chip, transmits a completion notice to the electronic money server 2 (step 12).

With this completion notice, it is possible to make the electronic money server 2 aware that the predetermined electronic money member number (mobile) has been set in the mobile phone 7.

Upon receipt of the completion notice from the mobile phone 7, the electronic money server 2 adds to users registered in the user information database 27 the user corresponding to the electronic money member number assigned anew to the mobile phone 7, and memorizes the user information transmitted from the user in association with the electronic money member number, thereby updating the user information database 27 (step 18).

The above process makes it possible to form the electronic money function part 16 in the mobile phone 7 and register the user in the user information database 27 together with the electronic money member number.

Figure 8:
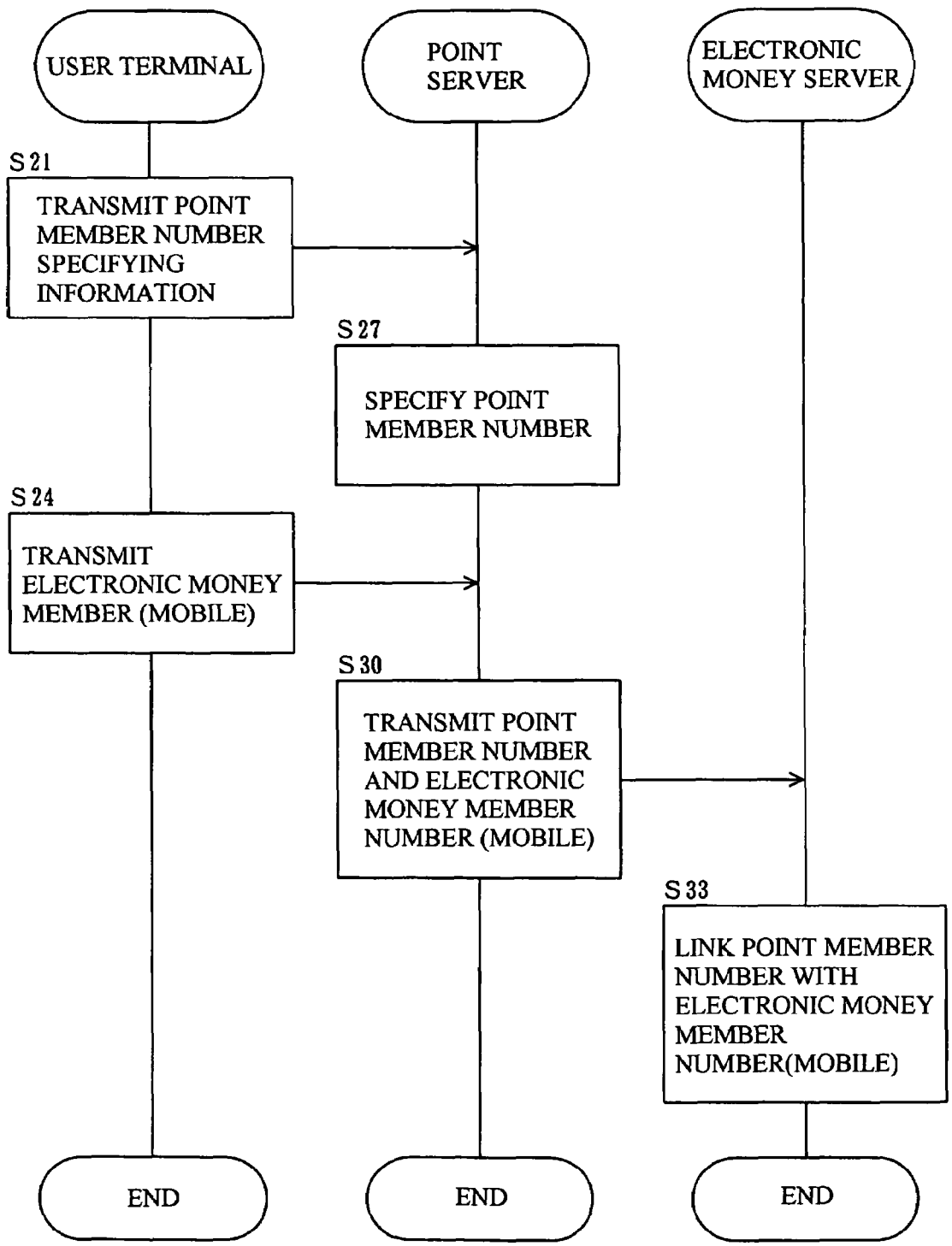
FIG. 8 is a flowchart for explaining a procedure of linking a point member number with an electronic money member number (mobile)

FIG. 8 is a flowchart for explaining a procedure of linking the point member number with the electronic money member number (mobile).

After the electronic money function part 16 has been implemented in the mobile phone 7 in accordance with the procedure shown in the flowchart of FIG. 7, if the user is a point member of the point server 10, the electronic money member number (mobile) and the point member number are linked in the following procedure.

Also, in the case of a non-point member at the time of the implementation of the telephone function part 15 in the mobile phone 7, the linkage can be performed similarly after it becomes a point member.

First, the user accesses the point site on the point server 10 through the user terminal composed of a personal computer.

Note that the mobile phone 7 may be used as the user terminal, so that the point site is accessed through the mobile phone 7.

The user enters authentication information, such as a user ID and a password, in predetermined entry fields for the authentication information at the point site, and transmits it to the point server 10 (step 21).

The point server 10 performs user authentication, and thereafter performs a log-in process. Also, the authentication information is used to specify the point member number of the user (step 27).

After the user authentication, the point site provides various services specialized for the user, so that the user can select a desired service therefrom.

Here, it is assumed that a linkage service for the point member number and the electronic money member number (mobile) is selected.

When the user selects the linkage service, the point server 10 transmits to the user terminal entry screen data for entering the electronic money member number (mobile), and the user terminal uses the entry screen data to present the entry screen.

The user enters the electronic money member number (mobile) from the entry screen, and transmits it to the point server 10 (step 24).

Note that the electronic money member number (mobile) can be presented on the display of the mobile phone 7, and by referring to it, the user can enter the electronic money member number (cell).

The point server 10 receives the electronic money member number (mobile) from the user terminal, and transmits it together with the point member number specified at step 27 to the electronic money server 2 (step 30).

The electronic money server 2 receives the point member number and the electronic money member number (mobile) from the point server 10. As such, the electronic money server 2 includes an electronic money function ID information (electronic money member number) retrieving means and a point ID information (point member number) retrieving means.

Then, the electronic money server 2 (linkage part 22) searches the user information database 27 for the point member number and the electronic money member number (mobile), and links them together (step 33).

As such, the electronic money server 2 includes an associating means for associating the electronic money function ID information with the point ID information.

The above process makes it possible to link the point member number with the electronic money member number (mobile).

Figure 9:
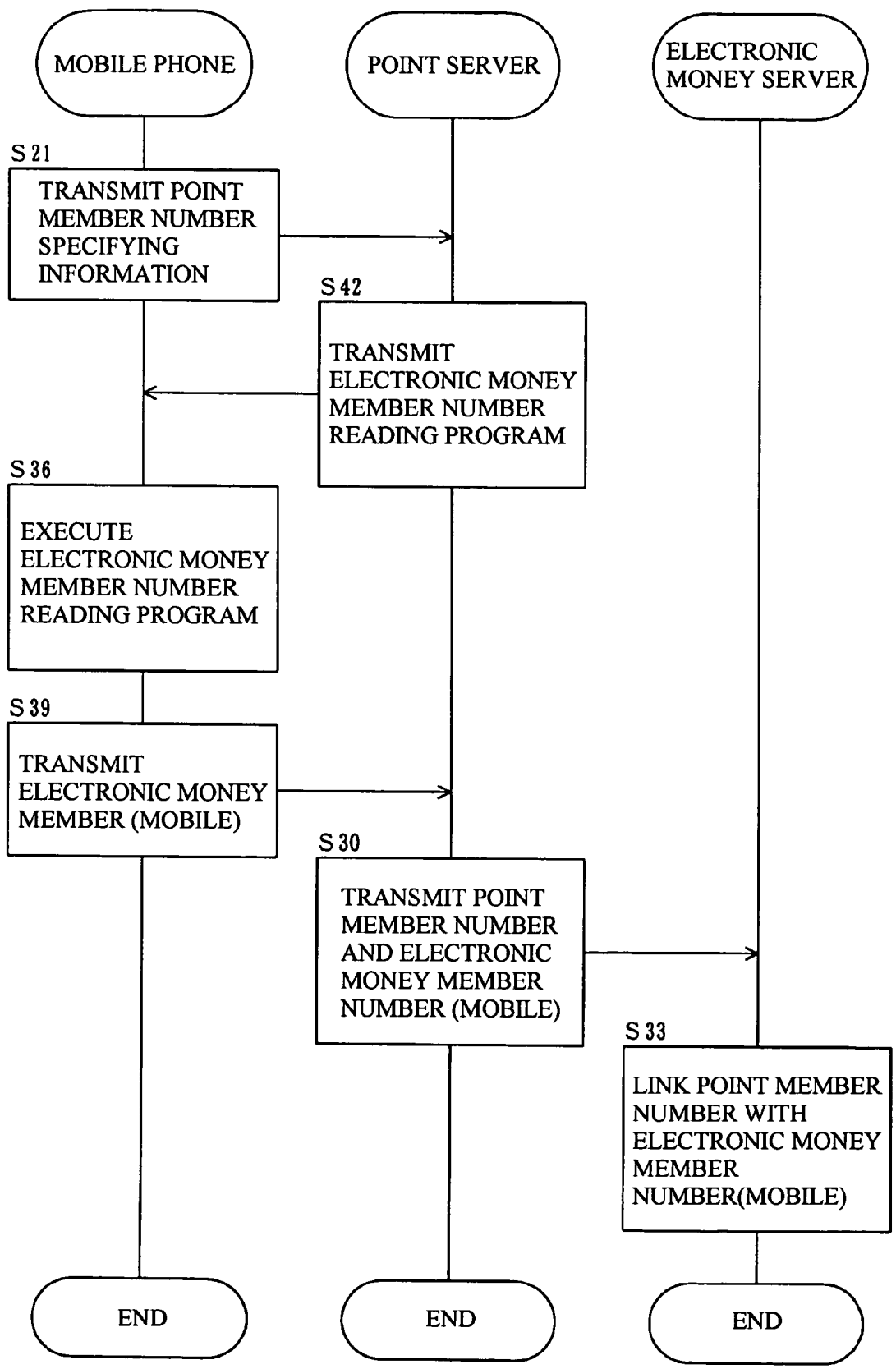
FIG. 9 is a flowchart for explaining another procedure of linking a point member number with an electronic money member number (mobile)

Next, referring to FIG. 9, another procedure for linking the point member number with the electronic money member number (mobile) will be described.

In the procedure in the flowchart of FIG. 8, the user enters the electronic money member number (mobile) in the point site, but in the following procedure, the electronic money member number (mobile) can be automatically transmitted from the mobile phone 7 to the point server 10.

Also, the same steps as those of FIG. 8 are denoted by the same step numbers, and the description thereof is simplified.

In this case, the point server 10 constitutes an information providing device for providing the electronic money server 2 with the electronic money function ID information (electronic money member number) and the point ID information (point member number).

First, the user accesses through the mobile phone 7 a point site set up by the point server 10 via the Internet 4.

Then, user authentication information (which constitutes point member number specifying information) is entered in the point site, and transmitted to the point server 10 (step 21).

The point server 10 (point site part 32) receives the user authentication information, and uses it to perform user authentication.

This allows the point server 10 to retrieve the point member number of the user (point ID information retrieving means).

After the user authentication, services available to the user are selectably presented to the user; here, it is assumed that the user selects a linkage service for the point member number and the electronic money member number (mobile).

When the user selects the linkage service, the point server 10 transmits a program for reading an electronic money member number to the mobile phone 7 (step 42).

This program allows the CPU of the mobile phone 7 to carry out the function of reading the electronic money member number (mobile) from the electronic money function part 16 and transmitting it to the point server 10.

As such, the point server 10 includes a reading program transmitting means.

The mobile phone 7 receives and executes the electronic money member number reading program (step 36).

As a result, the CPU of the mobile phone 7 communicates with the CPU of the contactless IC chip, reads the electronic money member number (mobile) of the electronic money function part 16, and transmits it to the point server 10 (step 39).

The point server 10 receives the electronic money member number (mobile) from the cell phone 7, and transmits it together with point member number to the electronic money server 2 (step 30).

As such, the point server 10 includes a terminal ID receiving means.

The electronic money server 2 (linkage part 22) receives the point member number and the electronic money member number (mobile) from the point server 10, and links the point member number with the electronic money member number (mobile) (step 33).

As such, the user can link the point member number with the electronic money member number (mobile) without entering the electronic money member number (mobile).

Figure 10:
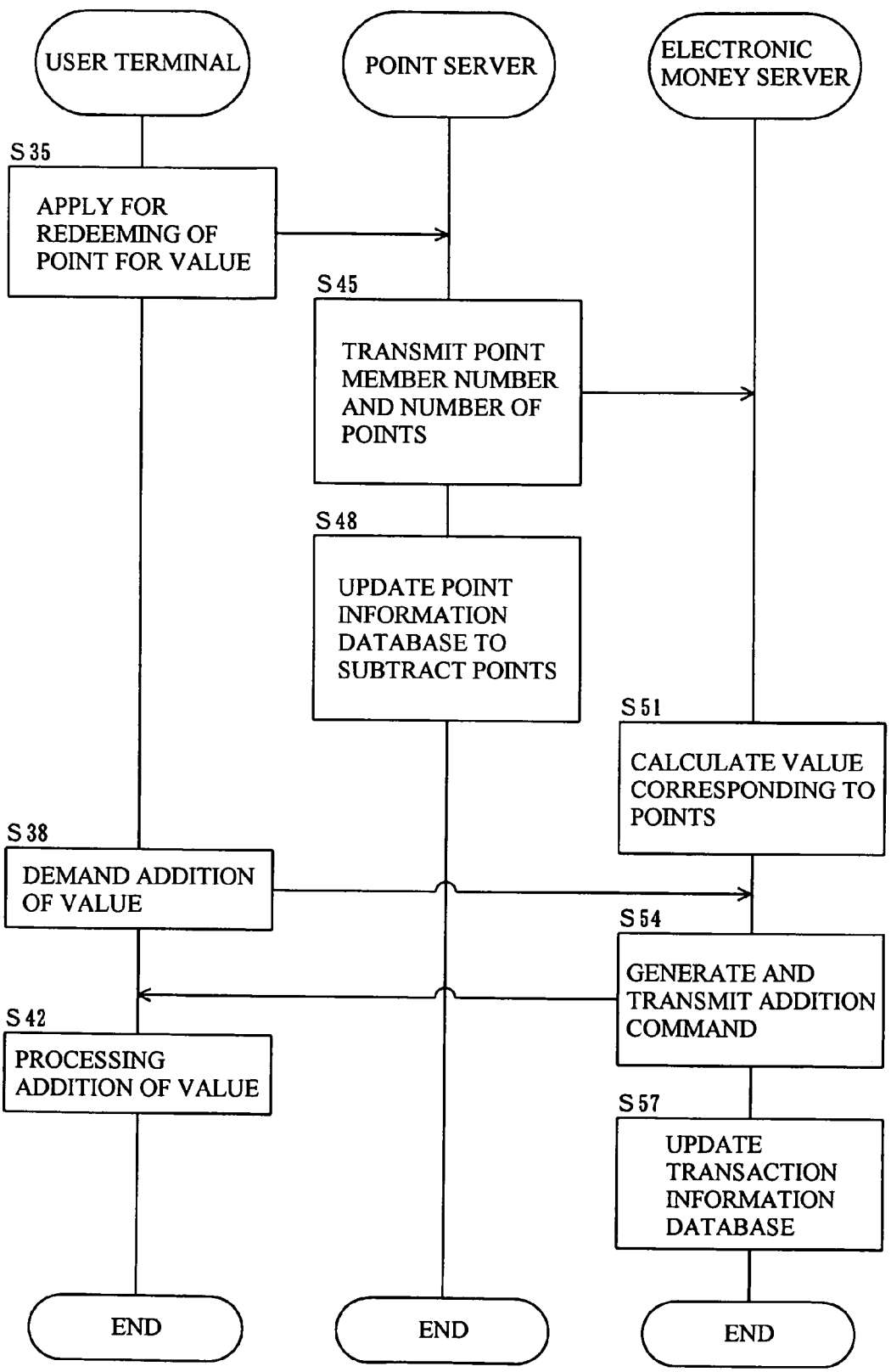
FIG. 10 is a flowchart for explaining a procedure of redeeming points for VALUE.

FIG. 10 is a flowchart for explaining a procedure of redeeming points for VALUE.

In this example, the user sets up a reader/writer in the user terminal, and further installs an IC card 9 in the reader/writer to add VALUE to the IC card 9 via the reader/writer.

First, the user accesses through the user terminal a point site set up by the point server 10, and is subjected to user authentication. This allows the point server 10 (point site part 32) to specify the point member number of the user.

Then, the user selects a VALUE redeeming service from among services provided by the point site, and further designates the number of points that are to be redeemed for VALUE.

Through the above procedure, the user applies for redeeming of points for VALUE with the point server 10 (step 35).

Note that in the present embodiment, the redeeming of points for VALUE can be performed in units of 10,000 points.

Next, the point server 10 (point site part 32) transmits to the electronic money server 2 the point member number of the member and the number of points that are to be redeemed for VALUE (step 45).

Then, the point server 10 (point processing part 31) updates the point information database 36 so as to subtract the points that are to be redeemed for VALUE (step 48).

On the other hand, the electronic money server 2 receives from the point server 10 the point member number and the number of points that are to be redeemed for VALUE.

Then, the electronic money server 2 (VALUE/point calculating part 23) searches the user information database 27 for an electronic money member number (card) linked with the received point member number.

Next, the electronic money server 2 (VALUE/point calculating part 23) uses a preset redeeming rate from point to VALUE to calculate the worth of VALUE based on the received number of points (step 51).

Then, the electronic money server 2 waits for the user to access there through the user terminal.

A notice that the VALUE obtained by redeeming of the points has been prepared for addition may be given to the user's e-mail address.

Next, the user accesses through the user terminal an electronic money site set up by the electronic money server 2.

At this time, the user transmits information for specifying the electronic money member number (card). Also, it can be so configured that the electronic money member number (card) is automatically transmitted to the electronic money server 2 by setting the IC card 9 in the reader/writer.

Then, the electronic money server 2 detects based on the electronic money member number (card) that the VALUE obtained by redeeming of the points has been prepared for addition, and notifies as such to the user.

The user sets the IC card 9 in the reader/writer, and demands addition of the VALUE (step 38).

The point server 10 (transaction processing part 24) reads the electronic money member number (card) of the IC card 9, and if it is confirmed that it is the IC card to which the VALUE should be added, then after that it generates an addition command to add VALUE equivalent to the amount obtained by redeeming of the points and transmits it to the user terminal (step 54).

The user terminal receives the addition command from the electronic money server 2, and inputs it to the IC card 9 via the reader/writer.

The IC card 9 executes the addition command to add the VALUE equivalent to the amount obtained by redeeming of the points (step 42).

On the other hand, the electronic money server 2 (transaction processing part 24) generates log data indicating that the VALUE has been added to the IC card 9, and updates the transaction information database 28 by writing the VALUE obtained by redeeming of the points thereto (step 57).

Figure 11:
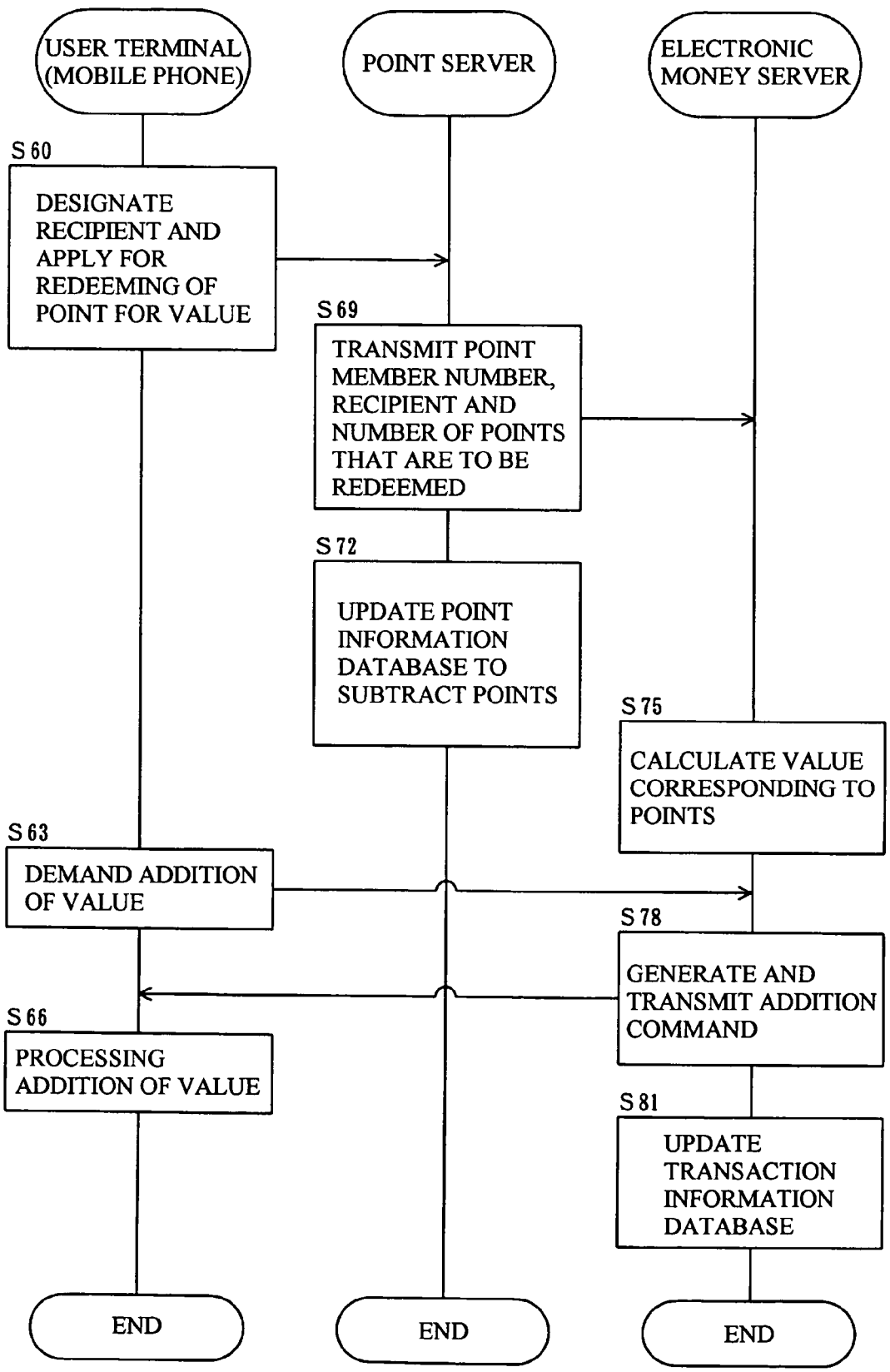
FIG. 11 is a flowchart for explaining another procedure of redeeming points for VALUE.

FIG. 11 is a flowchart for explaining another procedure of redeeming points for VALUE.

In this example, the user is able to select a VALUE addition object from the mobile phone 7 and the IC card 9.

As such, in the present embodiment, it is possible to link a plurality of electronic money member numbers with a single point member number, and select an object to which VALUE obtained by redeeming of points should be added from mobile terminals identified by the plurality of electronic money member numbers.

As in the example described in conjunction with the flowchart of FIG. 10, the user accesses through the user terminal the point site, and is subjected to user authentication, and thereafter the user designates the number of points that are to be redeemed and either the mobile phone 7 or the IC card 9 as a recipient of VALUE (addition object), thereby applying for redeeming of points for VALUE (step 60).

In response to this, the point server 10 (point site part 32) transmits to the electronic money server 2 information designating the point member number of the user, the number of points that are to be redeemed for VALUE and the recipient (step 69).

Then, the point server 10 (point processing part 31) updates the point information database 36, and subtracts the amount that is to be obtained by redeeming the user's points for VALUE (step 72).

The electronic money server 2 receives from the point server 10 the information indicating the point member number of the user, the number of points that are to be redeemed for VALUE and whether the mobile phone 7 or the IC card 9 should be set as a recipient.

As such, the electronic money server 2 includes a point information receiving means for receiving the point information (the number of points and the point member number).

Then, the electronic money server 2 (VALUE/point calculating part 23) searches the user information database 27 for an electronic money member number (mobile) linked with the point member number when the recipient is the mobile phone 7, and searches the user information database 27 for an electronic money member number (card) linked with the point member number when the recipient is the electronic money terminal 8.

Next, the electronic money server 2 (VALUE/point calculating part 23) calculates the amount of VALUE corresponding to the points (step 75).

Then, the electronic money server 2 waits until the user accesses for receiving the VALUE.

The user, when receiving the VALUE at the mobile phone 7, accesses through the mobile phone 7 the electronic money site set up by the electronic money server 2, and, when receiving the VALUE at the IC card 9, sets the IC card 9 in the reader/writer to access the electronic money site through the user terminal.

The user accesses the electronic money site, and thereafter demands of the electronic money server 2 to add the VALUE (step 63).

The electronic money server 2 (transaction processing part 24) receives the electronic money member number of the recipient, and if it is confirmed that the recipient is correct, then after that generates and transmits an addition command to add the VALUE equivalent to the amount obtained by redeeming of the points (step 78).

As such, the electronic money server 2 includes a command generating means and a command transmitting means.

At the user side, the addition command is executed to carry out a VALUE addition process (step 66).

More specifically, when the recipient is the mobile phone 7, an addition command is inputted from the telephone function part 15 of the mobile phone 7 to the electronic money function part 16, and executed in the electronic money function part 16.

As a result, the VALUE is added to the electronic money function part 16.

Also, when the recipient is the IC card 9, the addition command is inputted from the user terminal through the reader/writer to the IC card 9, and executed in the electronic money function part 19 of the IC card 9. As a result, the VALUE is added to the IC card 9.

Further, it is possible to designate the mobile phone 7 as the recipient, set the mobile phone 7 in the reader/writer provided in the user terminal and add the VALUE to the mobile phone 7 via the user terminal.

In the present embodiment, whether the mobile phone 7 or the IC card 9 should receive the VALUE is designated in the point site, but this is not restrictive and it can be so configured that the user designates it when accessing the electronic money site.

Figure 12:
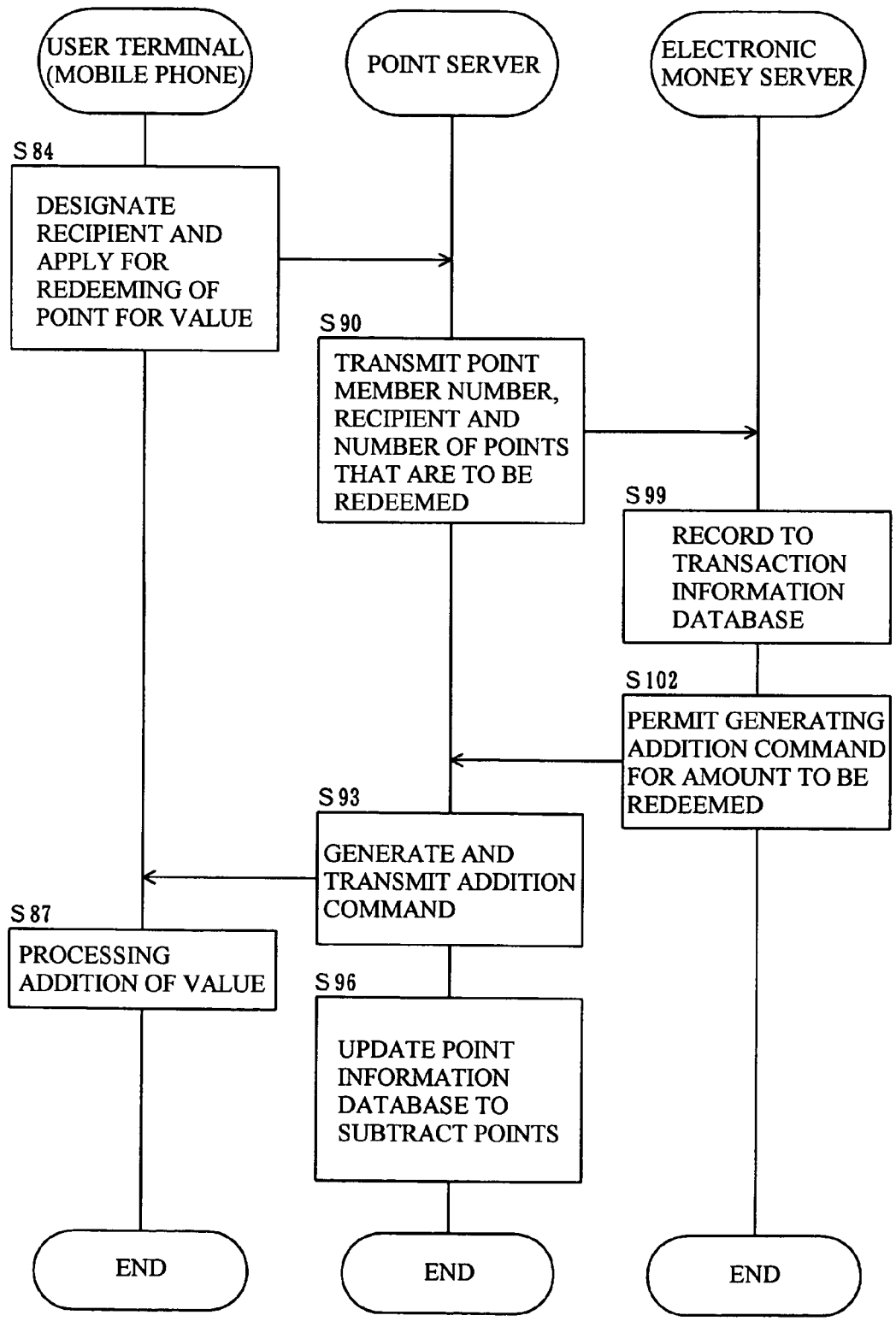
FIG. 12 is a flowchart for explaining yet another procedure of redeeming points for VALUE.

FIG. 12 is a flowchart explaining yet another procedure of redeeming points for VALUE.

In this example, the user is able to receive VALUE at the point site, and does not have to reaccess the electronic money site.

First, the user accesses the point site.

In this case, it is convenient to carry out the access via the user terminal including a reader/writer if VALUE is received at the IC card 9, or carry out the access by the mobile phone 7 if VALUE is received at the mobile phone 7, because the VALUE can be received immediately after the application for receiving the VALUE.

In the case of accessing the point site via the user terminal to receive VALUE at the mobile phone 7 or vice versa, the connection is switched to the recipient at the time of receiving the VALUE.

Specifically, in the case where the user terminal applies for receiving VALUE and the mobile phone 7 receives it, the cell phone 7 accesses the point site after the application, and receives the VALUE, for example.

Now, consider a case where the user terminal accesses the point site and IC card 9 receives VALUE.

After the point site is accessed via the user terminal and user authentication is performed, the user transmits and designates to the pointer server 10 the number of points that are to be redeemed for VALUE and the recipient of the VALUE, thereby applying for redeeming of points for VALUE (step 84).

Described here is the case where the IC card 9 is designated as the recipient.

The point server 10 (point site part 32) receives from the user terminal information designating the point member number, the number of points that are to be redeemed for VALUE and the recipient, and transmits it to the electronic money server 2 (step 90).

The electronic money server 2 (VALUE/point calculating part 23) uses the point member number to search the user information database 27 and retrieve the electronic money member number (card) of the user based on linkage correspondence.

Note that in the case where the mobile phone 7 is designated as the recipient, the electronic money member number (mobile) is searched for.

Further, the electronic money server 2 (VALUE/point calculating part 23) calculates the amount of VALUE that is to be added to the IC card 9 based on the number of points.

Then, the electronic money server 2 (transaction processing part 24) redeems points for that amount of VALUE, and writes and records to the transaction information database 28 log data indicating that addition is performed on the electronic money member number (card) (step 99).

Then, the electronic money server 2 transmits to the point server 10 permission to generate an addition command for VALUE equivalent to the amount that are to be obtained by redeeming (step 102).

At this time, the electronic money member number (card) is also transmitted to the point server 10.

The point server 10 (point site part 32) receives the permission to generate an addition command from the electronic money server 2, generates an addition command to add the amount that is to be obtained by redeeming, and transmits it to the user terminal (step 93).

At this time, the electronic money member number (card) of the IC card 9 is retrieved from the user terminal to check whether it is identical to that transmitted from the electronic money. server 2. If identical, the process is continued, and if not identical, the process is terminated.

If the electronic money member number (card) is identical, the point server 10 (point processing part 31) updates the point information database 36 so that the points that are to be redeemed is subtracted for the point member number (step 96).

On the other hand, the user terminal receives the addition command from the point server 10, and inputs it to the IC card 9 via the reader/writer.

In the IC card 9, the electronic money function part 19 executes the addition command to add the VALUE (step 87).

As a result, the user can redeem the points to VALUE and receive it.

While the foregoing has been described with reference to the flowcharts of FIGS. 11 and 12 and with respect to the case where the recipient is designated and points are redeemed for VALUE and received, it is not intended to limit the recipient to a binary selection between the mobile phone 7 and the IC card 9, and it can be so configured that the amount that is to be received can be designated for each recipient, for example, in such a manner that VALUE equivalent to 10,000 points is received at the mobile phone 7 and VALUE equivalent to 20,000 points is received at the IC card 9.

Figure 13:
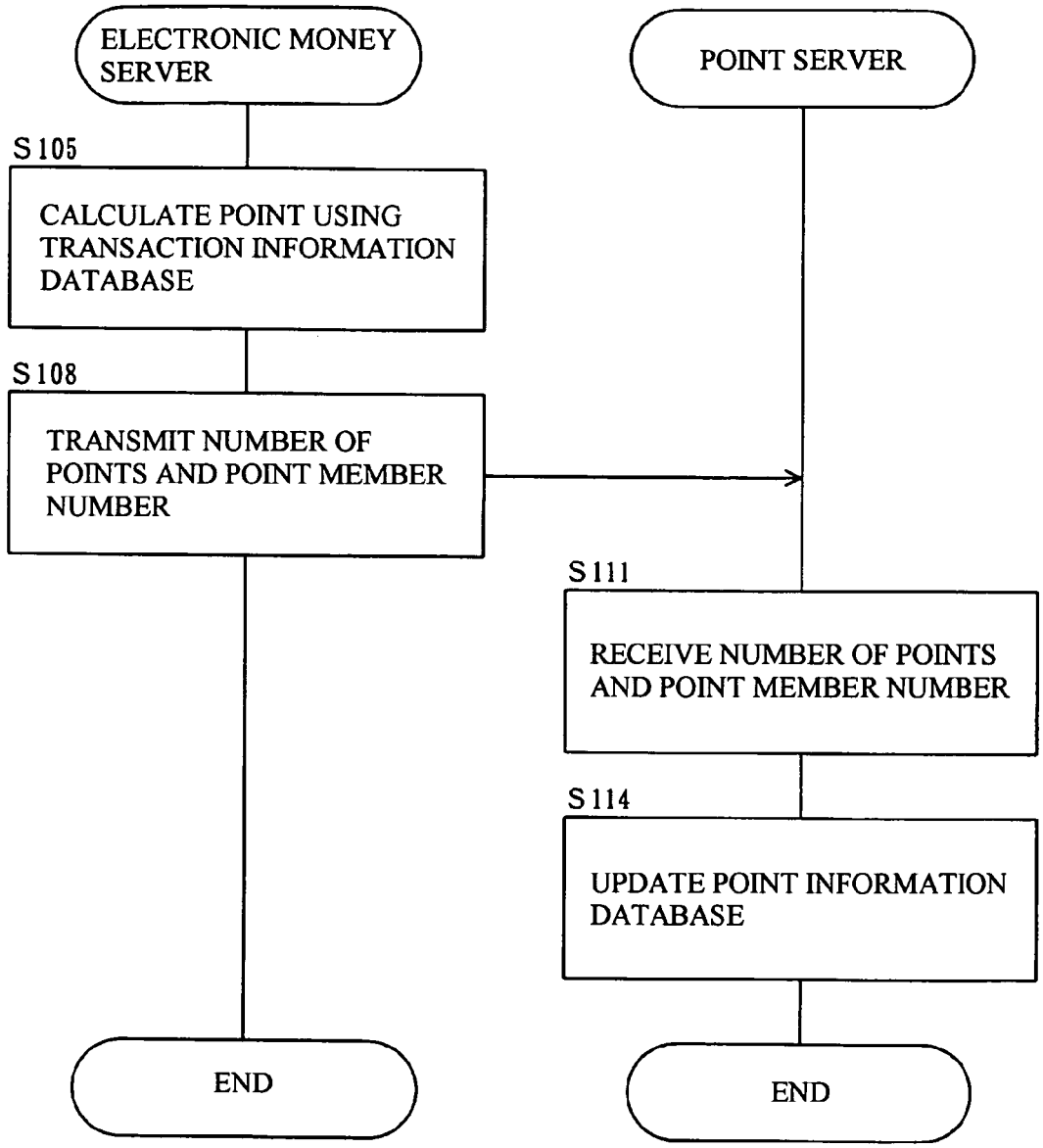
FIG. 13 is a flowchart for explaining the procedure of issuing points for VALUE used by the user.

FIG. 13 is a flowchart for explaining the procedure of issuing points for VALUE used by the user.

First, the electronic money server 2 regularly performs batch processing or the like to search the transaction information database 28 and calculate the number of points generated in response to VALUE used by the mobile phone 7 or the IC card 9 (step 105).

The calculation of the number of points is carried out for each electronic money member number with respect to log data accumulated over a time period since the previous batch processing for issuing points until the current batch processing for issuing points.

In the present embodiment, the issuance of points is carried out for the amount of payment in VALUE, and the rate of issuing points is predetermined, e.g., 1 point is issued for the payment of VALUE corresponding to 200 yen.

Note that points may be issued based on the amount of added VALUE, or points may be issued for both the added amount and the paid amount.

Next, the electronic money server 2 searches the user information database 27 to retrieve a point member number linked with the electronic money member number for which points are issued, and links the point member number with the issued points.

Then, the electronic money server 2 transmits the linked point member number and points to the point server 10 (step 108).

Note that in the case where a single point member number is linked with a plurality of electronic money member numbers, the electronic money server 2 may combine points issued for the plurality of electronic money member numbers and transmit them to the point server 10 or may separately transmit them to the point server 10.

The point server 10 receives the point member number and the number of points from the electronic money server 2 (step 111).

Then, the point server 10 adds the number of points issued by the electronic money server 2 with respect to the received point member number in the point information database 36 to update the point information database 36 (step 114).

With the above process, the user is able to obtain points managed by the point business entity for the use of VALUE by the mobile phone 7 and the IC card 9.

Figure 14:
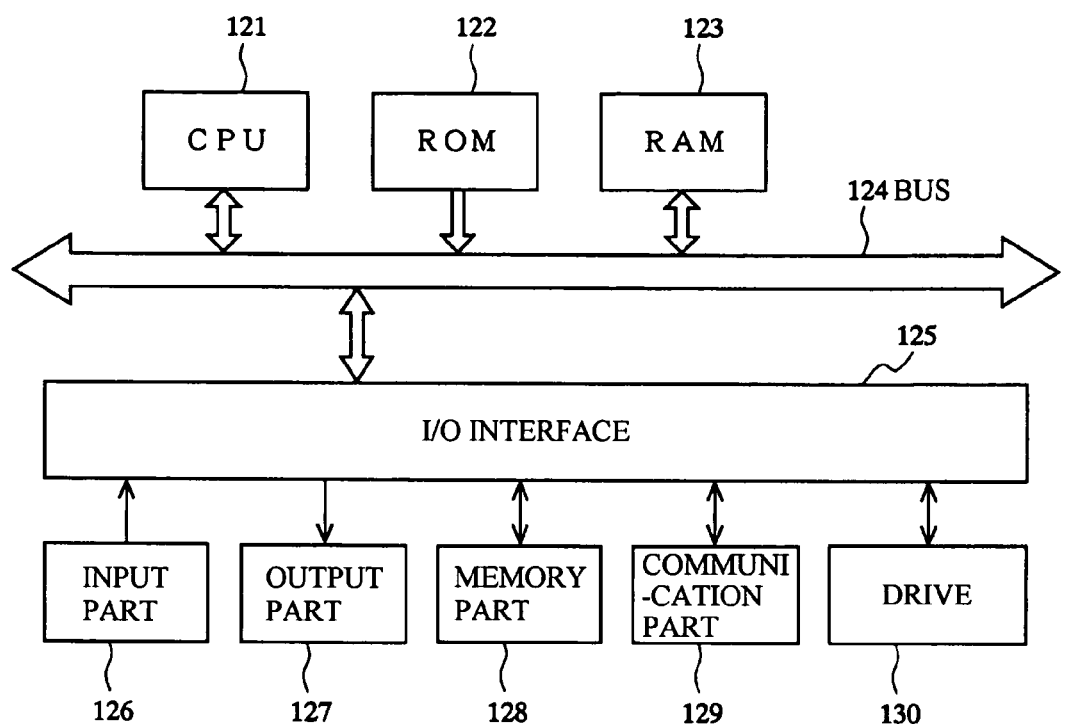
FIG. 14 is a diagram illustrating an exemplary hardware configuration of an electronic money server.

FIG. 14 is a diagram illustrating an exemplary hardware configuration of the electronic money server 2.

A CPU 121 executes a variety of types of processing in accordance with a program memorized in a ROM (Read Only Memory) 122 or a program loaded from a memory part 128 to a RAM 123.

For example, as described in conjunction with FIGS. 7 to 13, the CPU 121 carries out information processing by using the linkage between a point member number and an electronic money member number, e.g., by linking a point member number with an electronic money member number (card) and further linking the point member number with an electronic money member number (mobile), performing redeeming of points for VALUE and adding the VALUE to a mobile phone 7 or an IC card 9, or issuing points upon use of VALUE by a mobile phone 7 or an IC card 9 and giving a notice to the point server 10.

The CPU 121, the ROM 122 and the RAM 123 are mutually connected via a bus 124.

The bus 124 is also connected to an I/O interface 125 through which the CPU 121 is connected to an input part 126, an output part 127, the memory part 128, a communication part 129, a drive 130 and so on.

The input part 126 is provided with input devices such as a keyboard and a mouse, and therefore the administrator of the electronic money server 2 can enter character information, various commands and other information in the electronic money server 2.

The output part 127 is provided with, for example, a picture display unit composed of a CRT (Cathode-ray Tube), an LCD (Liquid Crystal Display) or a plasma display and a printing device such as a printer, and therefore the administrator of the electronic money server 2 can output character information and other information.

With the input part 126 and the output part 127, the administrator of the electronic money server 2 can, for example, maintain the electronic money server 2 and upgrade programs.

The memory part 128 is composed of a memory device such as a hard disc, and has memorized therein an information processing program for implementing in the CPU 121 the function of performing information processing related to electronic money as shown in FIGS. 7 to 13, an OS (Operating System), which is a basic program for controlling the electronic money server 2, the user information database 27, and the transaction information database 28.

By executing the information processing program in the CPU 121, the issuance part 21, the linkage part 22, the VALUE/point calculation part 23 and the transaction processing part 24 are configured.

The communication part 129 is composed of a communication control device such as a modem or a terminal adapter, and connected to a network.

The CPU 121 communicates via the communication part 129 with the point server 10, the user terminal, the mobile phone 7, and other server devices and terminal devices.

The drive 130 is suitably attached as necessary with a memory medium such as a magnetic disc, an optical disc, a magneto-optical disc and a memory card.

The CPU 121 is able to drive these memory media by using the drive 130 to read/write programs and data.

The hardware configurations of the point server 10 and the user terminal are basically similar to that of the electronic money server 2.

The point server 10 memorizes and manages the user information database 35 and the point information database 36, and executes programs for configuring the point processing part 31 and the point site part 32.

The user terminal has the function of communicating with the point server 10 and the electronic money server 2 via the Internet 4, and in addition, it is equipped with a the reader/writer and has the function of communicating with the IC card 9.

The present embodiment as described above achieves the following effects.

(1) After incorporating an electronic money function part 16 into a mobile terminal such as a mobile phone 7, a point member number owned by the user of the mobile phone 7 and an electronic money member number (mobile) set for the electronic money function part 16 can be linked together.

(2) By downloading a reading program into the mobile phone 7 and executing it, the mobile phone 7 can automatically transmit the electronic money member number (mobile) to a point server 10.

(3) In the case where the user has a plurality of electronic money member numbers for the mobile phone 7, an IC card 9 and so on, they can be linked with a single point member number.

(4) By linking the single point member number with the plurality of electronic money member numbers, it is possible to select a recipient of VALUE obtained by redeeming of points from among the plurality of electronic money member numbers.

(5) By linking the single point member number with the plurality of electronic money member number, it is possible to collectively manage points issued with respect to the plurality of electronic money member numbers in the point server 10.

Note that in the present embodiment, the linkage between the point member number and the electronic money member number and the process of redeeming points for VALUE are performed by the electronic money server 2, but this is not restrictive, and an information processing device having such functions may be provided separately or the point server 10 may have such functions.

What is claimed is:

1. An information processing device for use in an information processing system having a function of communicating with a point managing device for managing accumulation and use of a point usable as an exchange value exchangeable with a predetermined product for each point ID information set for a user, which is an object to which the point is given, and a mobile terminal memorizing electronic money, which is electronic information representing an amount of currency value and transferring the currency value by increasing/decreasing the amount, having an electronic money processing function for executing a predetermined command to add/subtract the memorized amount of electronic money and being identifiable with electronic money function ID information set in association with the electronic money processing function, the information processing system having memorized therein an association between the point ID information and the electronic money function ID information and performing redeeming of a point managed with the memorized point ID information and electronic money memorized in a mobile terminal identified by electronic money function ID information, the information processing device comprising:

program transmitting means for transmitting a predetermined program for forming the electronic money processing function to the mobile terminal before forming the electronic money processing function;

electronic money function ID information retrieving means for retrieving electronic money function ID information set in association with the electronic money processing function formed by executing the transmitted predetermined program in the mobile terminal;

point ID information retrieving means for retrieving point ID information set for a user of the mobile terminal;

associating means for associating the retrieved electronic money function ID information with the retrieved point ID information;

point information receiving means for receiving the number of points and the point ID information from the point managing device;

command generating means for generating a command to redeem the received number of points for electronic money at a predetermined redeeming rate and add the electronic money obtained by redeeming; and command transmitting means for transmitting the generated command to a mobile terminal identified with the electronic money function ID information associated with the received point ID information by the associating means.

2. The information processing device according to claim 1, wherein, the associating means is capable of associating a single piece of point ID information with a plurality of pieces of electronic money function ID information, and a mobile terminal to which electronic money obtained by redeeming a point managed with the single piece of point ID information is added is selectable from mobile terminals identified with the plurality of pieces of electronic money function ID information associated with the single piece of point ID information.

3. The information processing device according to claim 2, comprising point issuing means for issuing a point in response to a use of electronic money, wherein, the point managing device manages, with the single piece of point ID information, points issued by using electronic money with the mobile terminals identified with the plurality of pieces of electronic money function ID information, and the points issued by the point issuing means by using electronic money with the mobile terminals identified with the plurality of pieces of electronic money function ID information are provided to the point managing device together with point ID information associated with the electronic money function ID information for the mobile terminals.

4. An information providing device for providing point ID information and electronic money function ID information to an information processing device as claimed in claim 1, comprising:

point ID information retrieving means for retrieving point ID information;

reading program transmitting means for transmitting, to a mobile terminal having an electronic money processing function, a reading program for reading electronic money function ID information set in association with the electronic money processing function and transmitting the electronic money function ID information to a predetermined recipient; and electronic money function ID information receiving means for receiving electronic money function ID information transmitted by the mobile terminal by executing the transmitted reading program at the mobile terminal, wherein the retrieved point ID information is provided to the point ID information retrieving means of the information processing device, and the received electronic money function ID information is provided to the electronic money function ID information retrieving means of the information processing device.

5. An information providing method, which is a process carried out by an information providing device composed of a computer for providing point ID information and electronic money function ID information to an information processing device as claimed in claim 1, wherein, the computer includes point ID information retrieving means, reading program transmitting means, electronic money function ID information receiving means and providing means, the method comprising:

a point ID information retrieving step by the point ID information retrieving means for retrieving point ID information;

a reading program transmitting step by the reading program transmitting means for transmitting, to a mobile terminal having an electronic money processing function, a reading program for reading electronic money function ID information set in association with the electronic money processing function and transmitting the electronic money function ID information to a predetermined recipient;

an electronic money function ID information receiving step by the electronic money function ID information receiving means for receiving electronic money function ID information transmitted by the mobile terminal by executing the transmitted reading program at the mobile terminal; and a providing step by the providing means for providing the retrieved point ID information to the point ID information retrieving means of the information processing device and providing the received electronic money function ID information to the electronic money function ID information retrieving means of the information processing device.

6. An information processing method, which is a process carried out by a computer for use in an information processing system having a function of communicating with a point managing device for managing accumulation and use of a point usable as an exchange value exchangeable with a predetermined product for each point ID information set for a user, which is an object to which the point is given, and a mobile terminal memorizing electronic money, which is electronic information representing an amount of currency value and transferring the currency value by increasing/decreasing the amount, having an electronic money processing function for executing a predetermined command to add/subtract the memorized amount of electronic money and being identifiable with electronic money function ID information set in association with the electronic money processing function, the information processing system having memorized therein an association between the point ID information and the electronic money function ID information and performing redeeming of a point managed with the memorized point ID information and electronic money memorized in a mobile terminal identified by electronic money function ID information, wherein, the computer includes program transmitting means, electronic money function ID information retrieving means, point ID information retrieving means, associating means, point information receiving means, command generating means and command transmitting means, the method comprising:

a program transmitting step by the program transmitting means for transmitting a predetermined program for forming the electronic money processing function to the mobile terminal before forming the electronic money processing function;

an electronic money function ID information retrieving step by the electronic money function ID information retrieving means for retrieving electronic money function ID information set in association with the electronic money processing function formed by executing the transmitted predetermined program in the mobile terminal;

a point ID information retrieving step by the point ID information retrieving means for retrieving point ID information set for a user of the mobile terminal;

an associating step by the associating means for associating the retrieved electronic money function ID information with the retrieved point ID information;

a point information receiving step by the point information receiving means for receiving the number of points and the point ID information from the point managing device;

a command generating step by the command generating means for generating a command to redeem the received number of points for electronic money at a predetermined redeeming rate and add the electronic money obtained by redeeming; and a command transmitting step by the command transmitting means for transmitting the generated command to a mobile terminal identified with the electronic money function ID information associated with the received point ID information by the associating means.

* * * * *